United States Patent
Norimatsu

(12) 
(10) Patent No.: US 6,321,099 B1
(45) Date of Patent: *Nov. 20, 2001

(54) PORTABLE RADIO UNIT AND ANTENNA GAIN SWITCHING METHOD THEREOF

(75) Inventor: Hidehiko Norimatsu, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/888,528

(22) Filed: Jul. 7, 1997

Related U.S. Application Data

(63) Continuation of application No. 08/466,576, filed on Jun. 6, 1995, now abandoned.

(30) Foreign Application Priority Data

Jun. 23, 1994 (JP) .................................................... 6-141837

(51) Int. Cl.[7] ....................................................... H04B 1/38
(52) U.S. Cl. ............................... 455/575; 455/90; 455/83; 343/702
(58) Field of Search ................................ 455/89, 90, 128, 455/129, 348, 83, 550, 575; 343/889, 875, 901, 702; 335/259, 264

(56) References Cited

U.S. PATENT DOCUMENTS

| | | | |
|---|---|---|---|
| 3,905,063 | * | 9/1975 | Coulter et al. .......................... 16/48.5 |
| 4,725,845 | * | 2/1988 | Phillips ................................. 343/702 |
| 4,803,493 | * | 2/1989 | Jamison ................................ 343/901 |
| 4,903,333 | * | 2/1990 | Aizawa ................................. 455/269 |
| 4,920,352 | * | 4/1990 | Martensson et al. ................... 455/90 |
| 5,212,725 | * | 5/1993 | Yamamoto et al. ............... 455/277.1 |
| 5,497,506 | * | 3/1996 | Takeyasu ............................... 455/90 |

FOREIGN PATENT DOCUMENTS 2252326   10/1990   (JP) .

* cited by examiner

Primary Examiner—Edward F. Urban
(74) Attorney, Agent, or Firm—Ostrolenk, Faber, Gerb & Soffen, LLP

(57) ABSTRACT

In a radio unit having an antenna, a receiver and a transmitter, the present invention comprises a detector for detecting at least one signal of a receiving call and a sending call; and a gain switcher for switching gain of the antenna, based on a detection result of the detection means.

1 Claim, 6 Drawing Sheets

PORTABLE RADIO UNIT AND ANTENNA GAIN SWITCHING METHOD THEREOF

This is a continuation of application Ser. No. 08/466,576 filed on Jun. 6, 1995, now abandoned.

BACKGROUND OF THE INVENTION

The present invention relates to a radio unit for a mobile station used in mobile communications and more particularly, to a portable radio unit.

Among conventional radio units for mobile stations used in mobile communications, the portable radio unit carried by a user has been provided with a built-in retractable antenna with its length shortened by λ/2 or λ/4. Such a radio unit, for example, a radio phone system, is required to keep its antenna fully extended as much as the unit is allowed to the limit for keeping good receiving sensitivity during standby and communication periods.

Carrying the portable radio unit leaving its antenna fully extended is generally inconvenient for a user. So it is likely to be carried in a bag or in a pocket with its antenna retracted. Assuming that there is a call for the user while he/she is carrying it with its antenna retracted, communication between a base station of control signal for connecting the call and the destination radio unit is executed with the antenna left retracted. When the antenna is retracted, its gain is lowered. In case the user stands in a place of low electric field of transmission wave from the base station, it is likely to cause receiving failure, resulting in deteriorating receiving call rate. In case of giving a call by the radio unit with its antenna retracted may also deteriorate connection rate.

A means for enhancing the receiving sensitivity while the antenna of the portable radio unit is kept retracted has been disclosed in Japanese Patent Laid-Open No. 252326(1990). This Japanese Patent Laid Open No. 252326 (1990) relates to a cordless phone system provided with a base set and a hand set. In the above art, an electric wave between the base and hand sets may be selected to be the one with excellent S/N ratio (power ratio of signal to noise), for example, FSK, ASK, PSK, and MSK during standby period other than communication period. The receiving band of the hand set is further decreased to improve the S/N ratio in a weak electric field.

This system, however, requires a modulation means of a different electric wave mode such as SSB and FM, which further needs specific circuit construction, resulting in increased manufacturing cost.

SUMMARY OF THE INVENTION

It is an object of the present invention to provide a portable radio unit that enhances receiving sensitivity at receiving or origination a call to improve connectability with the radio base station even when the radio unit is carried with its antenna retracted.

The object of the present invention is achieved by a portable radio unit having an antenna, a receiver and a transmitter, comprising: detection means for detecting at least one signal of a receiving call and a sending call; and gain switching means for switching gain of the antenna, based on a detection result of the detection means.

Moreover, it is preferable that the gain switching means comprises means for extending the antenna and switching the gain of the antenna.

The present invention extends the antenna partly if it is retracted when the detection means has detected a receiving call or a sending call.

By this, the gain of antenna is switched, receiving sensitivity is increased and connectability with a radio base station is increased, too.

BRIEF DESCRIPTION OF THE DRAWINGS

This and other objects, features and advantages of the present invention will become more apparent upon a reading of the following detailed description and drawings, in which.

DESCRIPTION OF THE PREFERRED EMBODIMENTS

An embodiment of the present invention is described referring to drawings.

Figure 1:
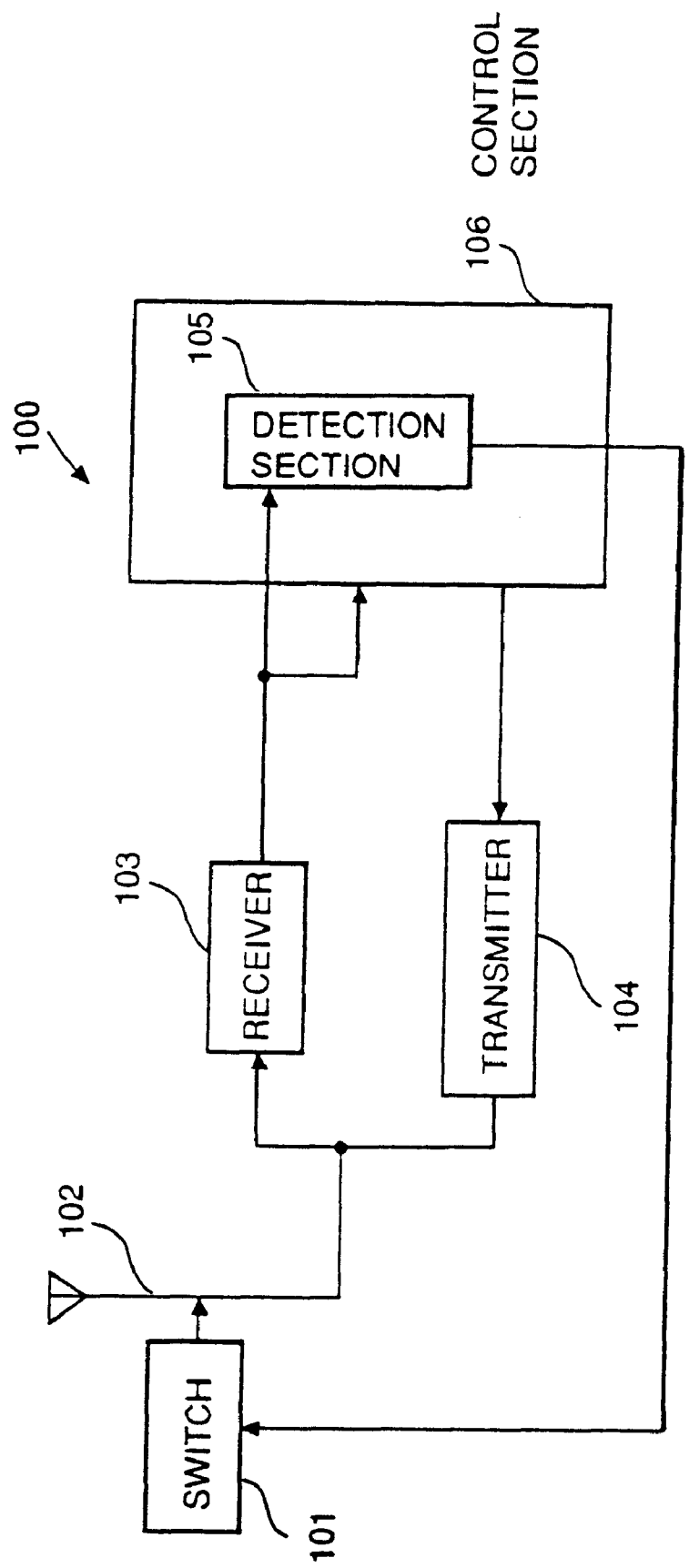
FIG. 1 is a block diagram of an embodiment of a portable radio unit of the present invention.

FIG. 1 is a block diagram of a portable radio unit according to the present invention. This embodiment assumes that a portable radio unit based on the invention is used for a mobile unit of a portable phone system, that is a handy phone.

Referring to FIG. 1, a portable phone system is briefly explained.

When power is turned on, the portable phone 100 is set to a standby status. An antenna 102 is kept in the retracted position. Under the standby status, the antenna 102 always receives a receiving control channel sent from a radio base station (not shown). The receiving control channel contains a receiving signal and any other information required to give a call.

The signal received by the antenna 102 is demodulated in a receiver 103, and transmitted to a control section 106.

In order to give a call by the portable phone 100, signals generated in the control section 106 are modulated and amplified in a transmitter 104, and transmitted to the radio base station (not shown) from the antenna 102.

Under the standby status, when a detection section 105 of the control section 106 detects a receiving call signal, the detection section 105 sends a switch control signal to a switch 101. The switch 101 is actuated to extend the antenna 102 partially from its fully retracted position (this action is hereinafter referred to as "pop up"). Since the antenna 102 pops up responding to the detection of the receiving call signal, succeeding receiving/transmitting with the radio base station may be executed with excellent receiving sensitivity.

While in case of giving a call, the antenna 102 of the portable phone 100 is expected to be extended. Even when starting the call without extending the antenna 102, the detection section 105 of the control section 106 is so designed to send a switch control signal to the switch 101 upon detection of a transmission signal, thus popping up the antenna 102. Although the antenna 102 is still partially retracted, sending/receiving with the radio base station may be executed under the condition of enhanced receiving sensitivity.

Figure 2:
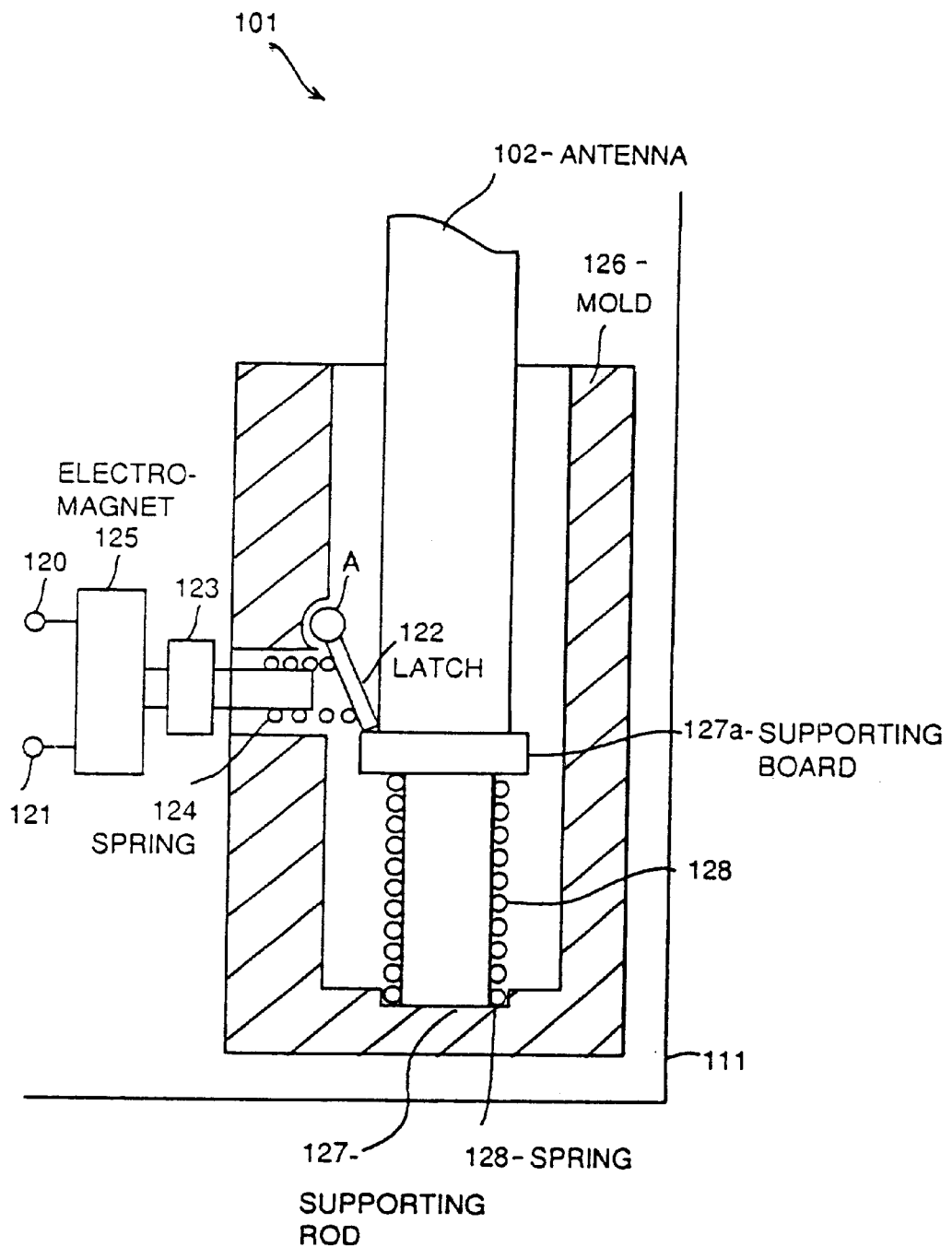
FIG. 2 is a sectional view of a switch part of the embodiment of the portable radio unit of the present invention.
Figure 3:
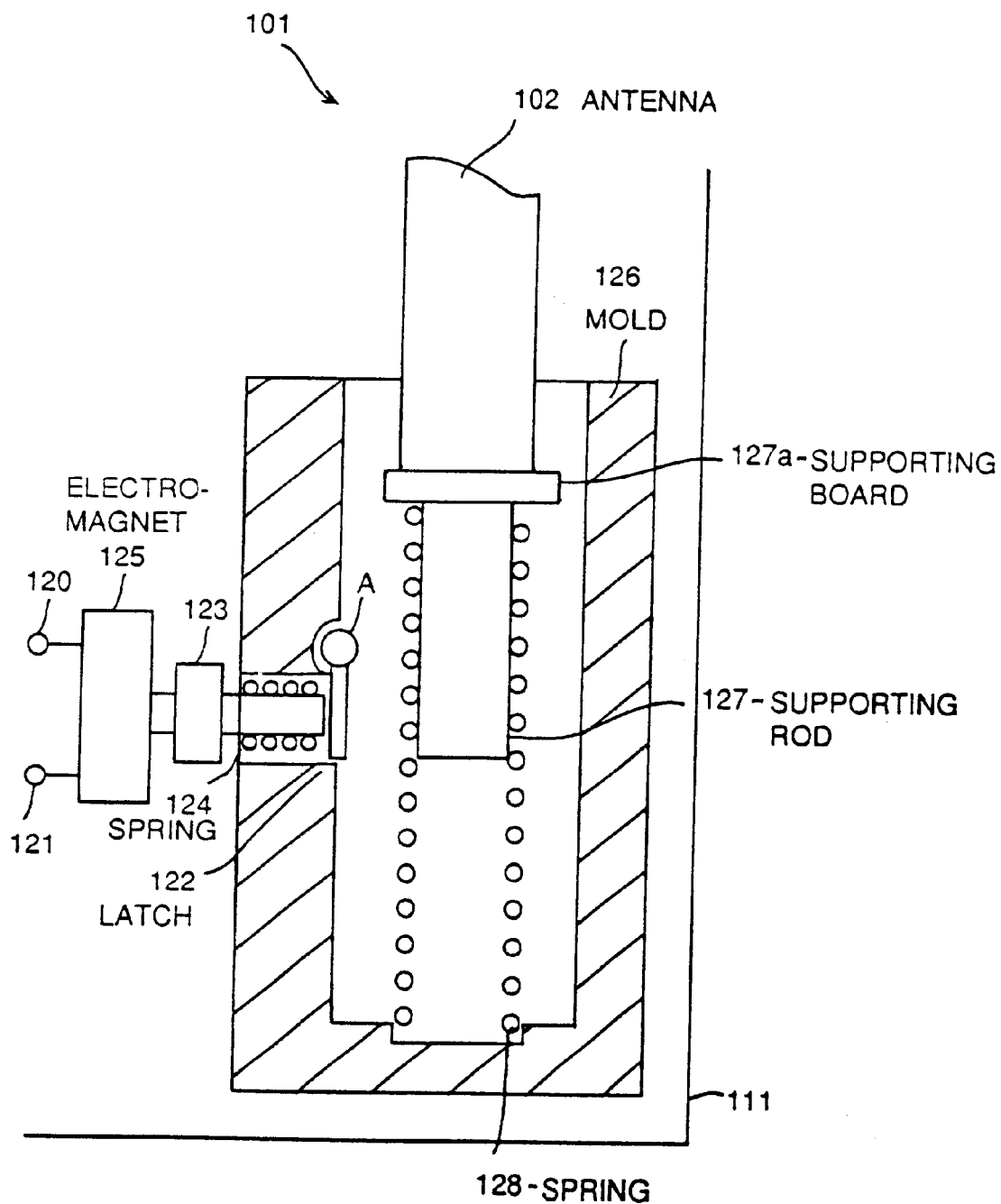
FIG. 3 is a sectional view of a switch part of the embodiment of the portable radio unit of the present invention.
Figure 4:
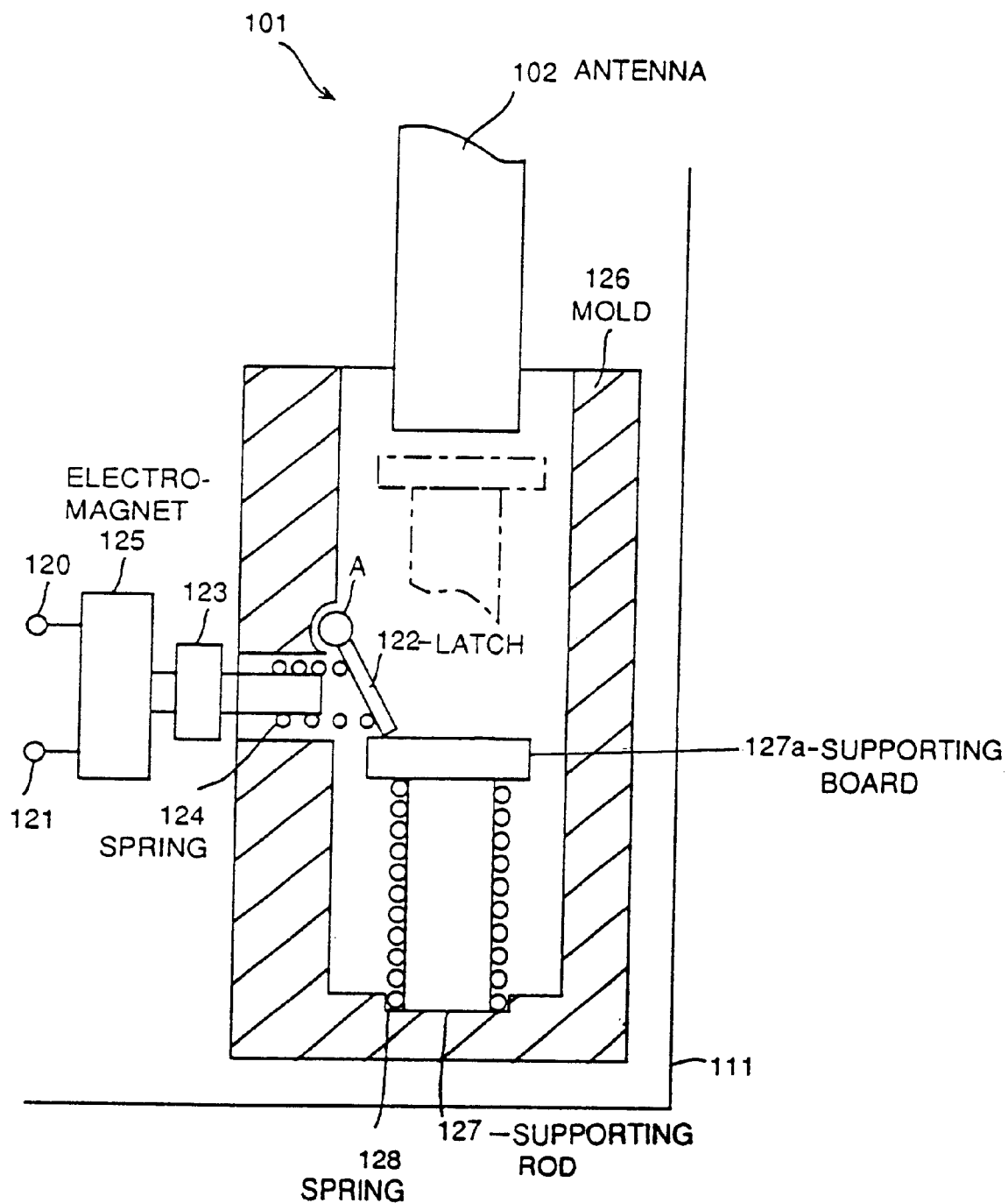
FIG. 4 is a sectional view of a switch part of the embodiment of the portable radio unit of the present invention.

Referring to FIG. 2, the "pop up" action is described. FIGS. 2 to 4 represent sectional views of an example of a switch 101 (See FIG. 1) placed in an enclosure 111 of the portable phone 100. FIG. 2 shows that the antenna 102 is retracted. FIG. 3 shows that the antenna 102 is popped up. FIG. 4 shows that the antenna 102 is extended.

As FIG. 2 shows, the switch 101 comprises a supporting rod 127 loosely attached to a bottom of a mold 126, a spring 128 provided about a periphery of the supporting rod 127, a piston 123 which is so set to move inside or outside of the mold 126 through a space formed in a side wall of the mold 126, a spring 124 provided about a periphery of the piston 123 with its left end fixed thereto, a latch 122 attached to an inner wall of the mold 126 opposite to the piston 123 so as to rotate in relation to a bearing point A, and an electro-magnet 125 placed outside the mold 126 opposite to the piston 123.

The latch 122 is weakly pressed clockwise by a spring (not shown) attached to the bearing point A. The bottom end of the antenna 102 is supported by a supporting board 127a attached to a top end of the supporting rod 127 within the mold 126.

When the electromagnet 125 is not energized, the piston 123 receives rightward force applied by the spring (not shown) attached in the electromagnet 125 to be placed as FIG. 2 and FIG. 4 show.

A right end of the spring 124 reaches inside of the mold 126 to press the latch 122 rightward, i.e., counterclockwise against the weak clockwise suppressive force of the latch 122.

In order to retract the antenna 102, it is pushed downward with one's hand. As FIG. 2 shows, the bottom end of the antenna 102 contacts with the supporting board 127a to push down the supporting rod 127 against a spring 128. When the spring 128 is contracted to bring the supporting board 127a to be pushed down to the level lower than that of the bottom end of the latch 122, restoring force of the spring 124 causes the latch 122 to rotate counterclockwise with respect to bearing point A. Even though the supporting board 127a is released from the downward pressure applied by the antenna 102, the latch 122 serves to keep it in a position as shown in the drawing.

Under the above condition, when the detection section 105 shown in FIG. 1 detects a receiving call signal or a sending call signal, a switch control signal is sent to a switch 101 to supply a signal to the terminals 120 and 121 of the electromagnet 125.

As FIG. 3 shows, the electromagnet 125 is energized to attract the piston 123 leftward against restoring force of the spring within the electromagnet 125. By this, the spring 124 attached to the piston 123 moves leftward to cause its right end away to move from the latch 122. Accordingly the rightward force applied to the latch 122 is released to rotate clockwise to the bearing point A, being disconnected from the supporting board 127a. The supporting rod 127 is pushed up by a restoring force of a spring 128 to raise the antenna 102 upward. That is, the antenna 102 pops up.

When the switch control signals are used to execute the pop up, the electromagnet 125 is de-energized to return the piston 123 to the original position by restoring force of the spring within the electromagnet 125, as shown in FIG. 3 and FIG. 4.

When the antenna 102 is fully extended at standby or communication period, bottom end of the antenna 102 is raised to a level higher than the position to which the supporting board 127a reaches through restoring force of the spring 128 (shown in alternate long and short line) as shown in FIG. 4. Even when pop up is executed, i.e., the supporting rod 127 is pushed upward upon detection of the receiving/sending call, the supporting board 127a is not brought into contact with the bottom end of the antenna 102, which causes no problem.

Figure 5:
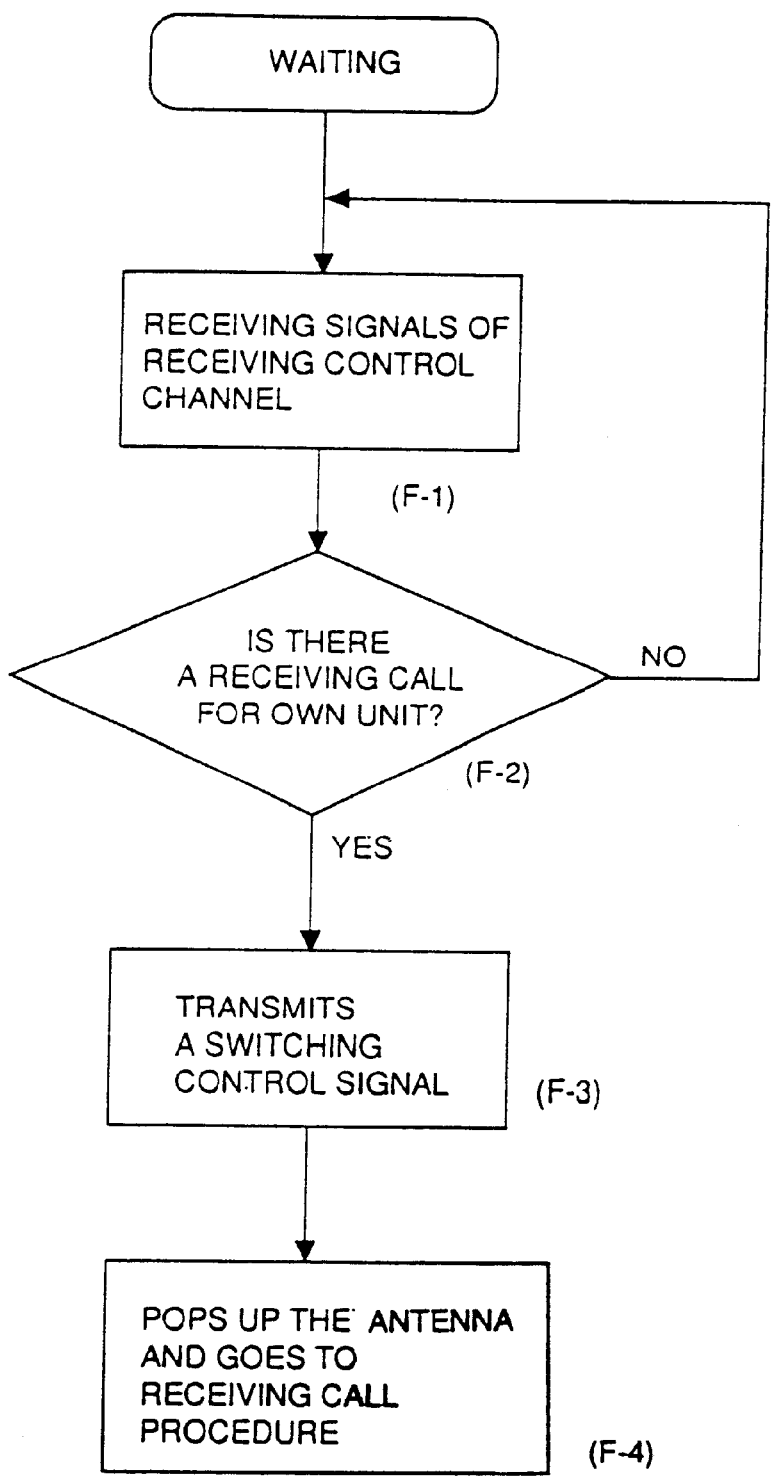
FIG. 5 is a flowchart showing a receiving process executed by the portable radio unit of the present invention.

Sequential operations of the portable radio unit 100 of FIG. 1 at receiving a call are described referring to a flowchart of FIG. 5.

Once the portable radio unit is set to the standby status, it always receives a receiving control channel. When receiving a broadcasting from a radio base station on the receiving control channel (F-1), the detection section 105 of the control section 106 determines whether or not the received signal contains the receiving call signal calling up its own station (F-2). If it determines that the received signal contains no receiving call signal calling up its own station, the process returns to step (F-1) to wait until receiving the next broadcasting. If it is judged that the receiving call signal is contained, the detection section 105 sends a switch control signal to a switch 101 (F-3). The antenna 102 then pops up to execute a call receiving process (F-4) as aforementioned referring to FIG. 3.

Figure 7:
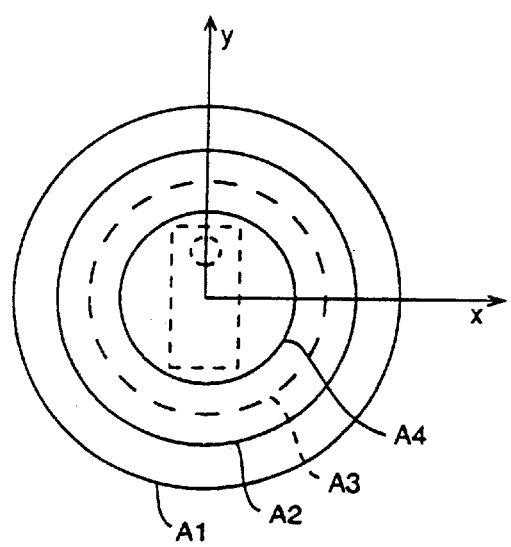
FIG. 7 is a view showing an antenna pattern when the antenna is extended ("pop up") to improve reception.

Characteristics of the antenna 102, especially to $\lambda/2$ antenna, at popping up is described referring to FIG. 7.

Figure 6:
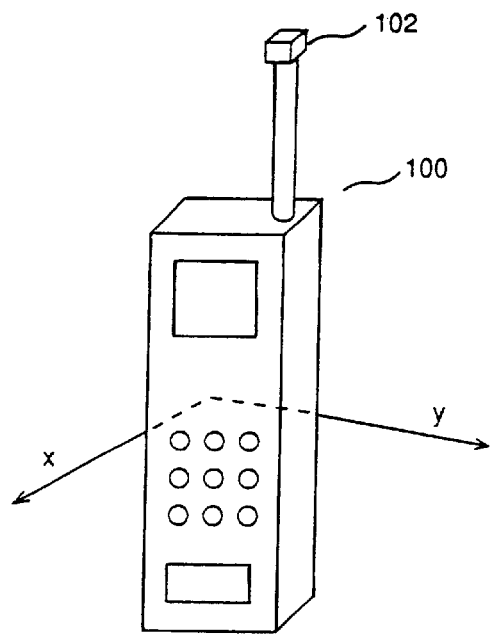
FIG. 6 is a view for explaining an antenna pattern when the antenna is extended ("pop up") to improve reception.

As FIG. 6 shows, it is assumed that "x" denotes the direction extending vertically to a front operation side of the portable radio unit 100, and "y" denotes the direction extending vertically to its side surface. Supposing that a circle A1 is designated as 0 $dB_d$ standard (gain based on dipole antenna) as shown in FIG. 7, radiation pattern of the radio waves in x and y directions results in $-4$ $dB_d$ (circle A2) when the antenna 102 is fully extended. When the antenna 102 is retracted (circle A4), it results in about $-10$ $dB_d$.

Contrary to this, in case the antenna 102 pops up (circle A3), it results in $-7$ $db_d$, thus improving its receiving sensitivity by approximately 3 $dB_d$ compared with the case with its antenna retracted. As a result, connectability with the radio base station is improved, allowing to facilitate receiving/transmitting therewith.

As described above, the portable radio unit of the present invention allows to enhance connection rate with the radio base station by improving the receiving sensitivity upon detection of the receiving/sending call even if the antenna is kept retracted.

What is claimed is:

1. A portable phone having a single antenna for communicating with a radio base station, a receiver and transmitter, comprising:

detection means for detecting a signal of a predetermined band of both a receiving call received by said signal antenna from said radio base station and a sending call from the portable phone to be transmitted by the single antenna, a mold, a supporting rod loosely attached to a bottom of said mold and for supporting one end of said single antenna, a first spring provided with a periphery of said supporting rod and pressing said supporting rod in an extension direction of said single antenna, a piston which is so set to move inside or outside of said mold through a space formed in a side wall of said mold, a second spring provided with a periphery of said piston with its left end fixed thereto, a latch attached to an inner wall of said mold opposite to said piston so as to rotate in relation with a bearing point and for keeping said supporting rod in a position where said single antenna is retracted, an electromagnet placed outside said mold opposite to said piston, and wherein said electromagnet sets said second spring free from said latch and releasing said supporting rod from control with said latch, when said detection means detects at least one signal of a predetermined band of both a receiving call and a sending call.

* * * * *